June 16, 1942. J. ALBERTOLI 2,286,250
CAN CONVEYING AND ELEVATING APPARATUS
Filed Nov. 26, 1940
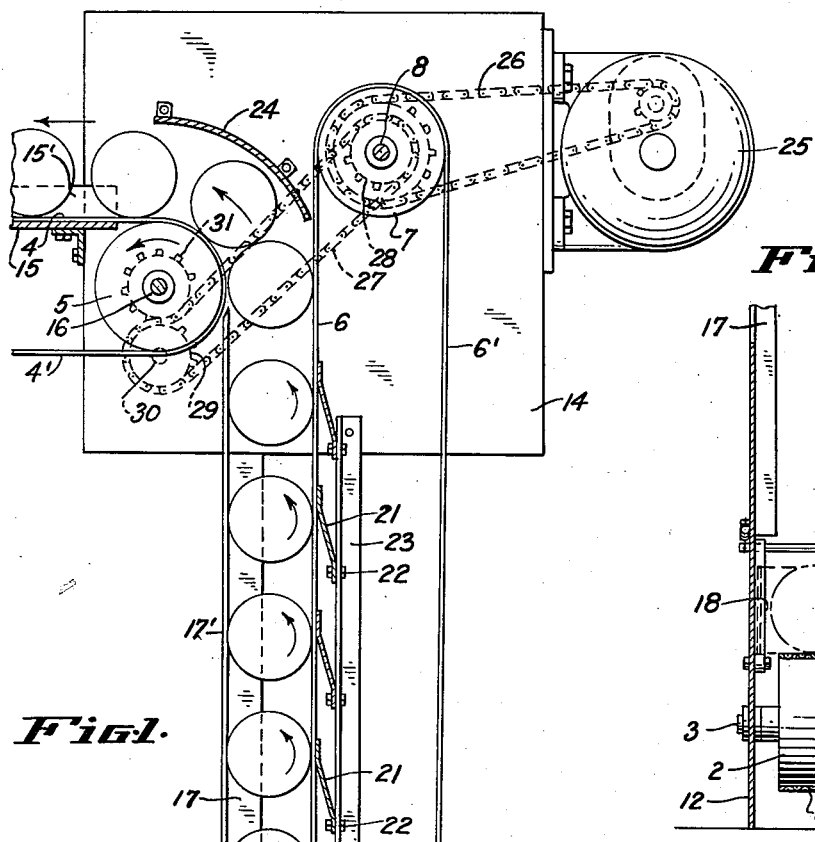
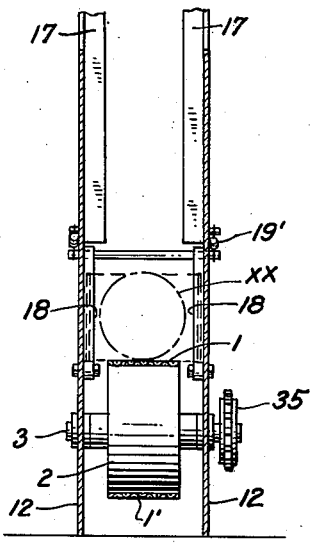
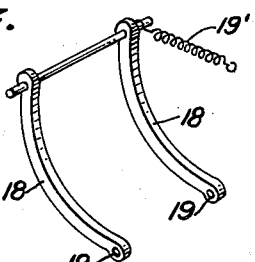
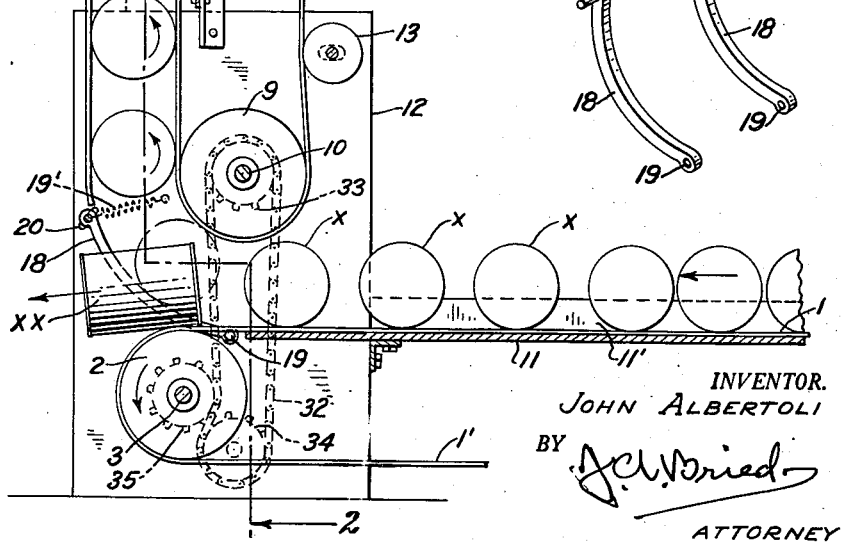
INVENTOR.
JOHN ALBERTOLI
BY
ATTORNEY though reference is to be had to the patent Office of June 16, 1942 2,286,250

UNITED STATES PATENT OFFICE 2,286,250

CAN CONVEYING AND ELEVATING APPARATUS

John Albertoli, San Francisco, Calif.

Application November 26, 1940, Serial No. 367,186

1 Claim. (Cl. 198—160)

This invention relates to cannery equipment and in particular to apparatus for conveying and elevating tin cans in the handling of the same in canneries and other plants using tin cans. The objects of the invention are to provide an improved construction in belt conveyors and elevators for handling tin cans and transferring the same from a belt conveyor at one level to a belt elevator for delivery therefrom to a belt conveyor at a higher level.

Novel features and details of the construction will appear in the following description and accompanying drawing.

In the drawing—

Fig. 1 is an elevation more or less diagrammatic, showing the relation between a lower can belt conveyor, the can belt elevator, and the upper can belt conveyor.

Fig. 2 is a fragmentary section of Fig. 1 as seen from the line 2—2 thereof.

Fig. 3 is a detached view showing the spring actuated lever which urges the cans into contact with the elevator belt.

Before describing the drawing in detail it should be stated that the present apparatus is designed particularly for the conveying, elevating, and further conveying of empty tin cans, and while it is known to applicant that cans have been carried or rolled along one level, directed into an elevator of some type to a higher level and discharged for further rolling or conveying elsewhere, and it is also known to applicant that belts have been used to elevate the cans by pressure of the belt against the side walls of the cans to induce a rolling action upward, but insofar as is known there is no direct and positive feeding of the cans from a belt conveyor into a belt elevator as is done in my improved apparatus, but the cans were permitted to fall into the elevator, and since the apparatus is more frequently used on empty than filled cans, and which empty cans are very light, there has been insufficient weight to urge them into proper contact with the belt elevator. Besides this, it frequently occurs that cans get turned the wrong way on the conveyor and there was no means for the automatic discharge of them when reaching the elevator, and hence they tended to block the elevator or cause trouble with the adjacent cans. With my system, however, I have so related my conveying belts to my can elevating belt as to effect a substantially unitary mechanism and have provided means for driving the whole assembly from one shaft or pulley, and whereby the cans are uniformly passed from the conveyor, by the force thereof, positively into contact with the elevating belt, so that the stream of cans over the conveyors and elevator is continuous and uniform at all times.

In order to carry out the above outline of the invention the mechanism shown in the drawing will suffice for illustrative purposes, though it should be of course remembered that various minor changes may be made within the scope of the invention.

In the drawing, 1 represents the upper run of a horizontal belt conveyor and 1' the return run traveling in the direction indicated by the arrows, over a head pulley 2 mounted on a shaft 3. 4 indicates the upper run of a second horizontal belt conveyor at any desired height above the lower belt conveyor, say one or two stories above the same if desired. 4' indicates the lower run of the upper belt conveyor, and 5 is one of the end pulleys over which the belt runs in the direction indicated by the arrows. 6 indicates the can contacting upright run of the belt elevator and 6' the return run, passing over head pulley 7 mounted on shaft 8, and lower pulley 9 mounted on shaft 10. X denotes the tin cans lying transversely upon the belt 1 and guided in an open top trough 11 along the bottom of which the belt 1 slides, and it should be noted that the belt is somewhat narrower than the cans, and that the side rails or walls 11' of the trough keep the ends of the cans in alignment. 12 designates a pair of spaced frame plates embracing pulleys 2 and 9 and spaced to form a continuation of the trough walls 11' and also form means for supporting suitable bearings (not shown) for shafts 3 and 10, and also for an adjustable idler pulley 13 for taking up any slack in belt run 6'. 14 represents a pair of frame plates embracing the two upper pulleys 5 and 7, also spaced to form a continuation of the side rails 15' of an upper trough 15 which slidably supports belt 4 in the same manner as described for the trough supporting belt 1. The upper frame plates 14 likewise support bearings for shafts 8 and 16 of the two upper pulleys in the same manner as described for the plates 12 in regard to the lower pulleys and shafts. For the vertical distance between the edges of plates 12 and 14, and which distance as previously suggested could be any desired amount, as from one story to another, rigid guides or rather guiding strips as of angle iron are provided as indicated at 17 to form a continuing guide for the ends of the cans in their upward movement, and also for their marginal ends to roll upon when pressed against the guides by the upwardly moving belt 6. A trough may be used instead of separate guides. The angle irons or at least the rear walls thereof as indicated at 17' are extended between the upper and lower plates to form an unbroken guide for the cans from one conveyor to the other, with the exception for a distance below the shaft 10 of pulley 9, and over which gap a curved section of the guides, or more correctly a gate 18 of two side bars, is provided, which bars are pivoted at their lower ends 19 respectively to the plates 12 and the upper end of the gate, resiliently urged toward pulley 9 by means of a spring 19' to the limit of a suitable stop slot 20, and which permits the gate to move toward pulley 9 to resiliently urge the tin cans against the upwardly moving belt 6.

The belt 6 is a plain belt without cleats or surface projections of any kind on it and it is resiliently urged against the cans in their vertical travel on the guides 17 by the belt, by means of a plurality of leaf springs 21 secured at one end as at 22 to a vertical frame bar as indicated at 23.

The space between the curved guide bars or strips 18 of the gate is sufficient to freely pass one of the tin cans if the same were inadvertently placed longitudinally on the belt 11 and arrived at the lower end of the elevator belt 6. A can in such position is indicated at XX in Fig. 1, and it will be seen as passing through the gate for automatic ejection from the stream of moving cans.

Adjacent the upper end of the upwardly traveling belt 6 is a fixed curved deflector 24 which directs the ascending cans toward pulley 5 to contact belt 4 passing therearound and to at once carry the cans onward along trough 15.

Shaft 8 is driven from any source of power such as from a back geared motor 25 indicated, through means of a belt or chain 26, and in turn shaft 8 drives shaft 16, as from a chain 27 passing around a suitable sprocket 28 secured to shaft 8 and over an idler sprocket 29 mounted on a shaft 30 which is below pulley 5 and which chain arcuately contacts a portion of another sprocket 31 mounted on shaft 16. In a similar manner shaft 10 drives shaft 3 through the agency of a chain 32 engaging sprockets 33 and 35 and passing around an idler 34.

*Mode of operation.*—By the mechanism described it will be seen that the motion of the lower belt conveyor 1 and that of the upper belt conveyor 4 as well as the vertical belt elevator 6 are at all times synchronized, or rather held in rigid relation by the unitary drive arrangement shown. The belt conveyors may of course be of any length and need not be exactly horizontal, but may be at an angle if desired. When the lower belt conveyor is loaded with cans extending transversely of the belt in its trough 11 from the opposite end not shown, the cans will all be moved along toward and under the lower elevator pulley 9, by the friction of the traveling belt, as well as by the inertia of the oncoming cans, and the cans will be one after the other forced against the resiliently suspended guides 18 or gate and will be thereby resiliently crowded against the vertically moving belt 6 and will be rolled up the guides 17 in a continuous stream and forced under the curved deflector 24 to actual contact with the upper belt 15 operating in its trough to continue the stream of cans in a more or less horizontal direction to any remote point. Also during this operation should any of the cans in the lower conveyor have been placed in wrongly or have been turned around from any cause, they will be automatically ejected as they pass over pulley 2 in the manner indicated by can XX.

Having thus described my improved cooperating conveying and elevating can handling equipment, I claim:

Round can handling equipment comprising an upwardly extending fixed guide or track along which the cans are adapted to be rolled, an endless belt running over upper and lower pulleys arranged with one run of the belt extending along said guide and in contact with a row of cans for rolling the cans upward along said guide, a laterally extending belt conveyor adapted to carry a row of cans directly under and feeding the cans under said lower pulley in position for engagement by its belt for rolling upwardly thereby along said fixed guide, a belt conveyor extending laterally from adjacent the upper end of said guide directly receiving the cans therefrom, and means driving and synchronizing the movement of both conveyors and said upwardly extending belt comprising pulleys for said belt conveyors respectively adjacent said upper and lower pulleys, sprockets operatively connected respectively with each pulley, an endless chain for the upper sprockets and an endless chain for the lower sprockets, said chains each looped around one of the sprockets and an idler sprocket at the other end of the chain loop positioned to bring an intermediate part of the chain strand into operative engagement with a portion of the adjacent sprocket.

JOHN ALBERTOLI.